(12) United States Patent
Ivans et al.

(10) Patent No.: US 11,760,475 B2
(45) Date of Patent: Sep. 19, 2023

(54) ARTICULATED TILTROTOR

(71) Applicant: Bell Textron Inc., Fort Worth, TX (US)

(72) Inventors: Steven R. Ivans, Ponder, TX (US); Berlin B. Benfield, Grapevine, TX (US); Brent C. Ross, Flower Mound, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 131 days.

(21) Appl. No.: 17/558,263

(22) Filed: Dec. 21, 2021

(65) Prior Publication Data

US 2023/0192286 A1    Jun. 22, 2023

(51) Int. Cl.
*B64C 29/00*    (2006.01)

(52) U.S. Cl.
CPC .................................. *B64C 29/0033* (2013.01)

(58) Field of Classification Search
CPC ............................ B64C 29/0033; B64C 27/52
See application file for complete search history.

(56) References Cited

U.S. PATENT DOCUMENTS

| 1,720,939 | A | * | 7/1929 | Wilkin | B64C 29/0033 |
| | | | | | 244/23 R |
| 3,128,829 | A | * | 4/1964 | Young | B64C 11/003 |
| | | | | | 416/88 |
| 2022/0194572 | A1 | * | 6/2022 | Choi | B64C 29/0033 |

OTHER PUBLICATIONS

Wikipedia, "Lockheed C-5 Galaxy," 24 pages retrieved from the Internet on Dec. 15, 2021; https://en.wikipedia.org/wiki/Lockheed_C-5_Galaxy.
Wikipedia, "Sikorsky S-64 Skycrane," 8 pages retrieved from the Internet on Dec. 15, 2021; https://en.wikipedia.org/wiki/Sikorsky_S-64_Skycrane.

* cited by examiner

*Primary Examiner* — Tien Q Dinh
*Assistant Examiner* — William L Gmoser
(74) *Attorney, Agent, or Firm* — Akona IP

(57) ABSTRACT

There is disclosed in one example a tiltrotor system for a vertical takeoff and landing (VTOL) aircraft, including: a rotor pylon, wherein the rotor pylon is rotatable, via a rotation maneuver, between a substantially horizontal orientation and a substantially vertical orientation; a linear actuator disposed to actuate the rotation maneuver; and a mechanical guide disposed to maintain a center of gravity along a substantially linear axis throughout the rotation maneuver.

17 Claims, 20 Drawing Sheets

ARTICULATED TILTROTOR

TECHNICAL FIELD

The present specification relates to rotary aircraft and more particularly, though not exclusively, to an articulated tiltrotor system in a tiltrotor aircraft.

BACKGROUND

Electric vertical takeoff and landing (eVTOL) aircraft, or rotorcraft, may be powered by a battery or a bank of batteries.

SUMMARY

There is disclosed in one example a tiltrotor system for a vertical takeoff and landing (VTOL) aircraft, including: a rotor pylon, wherein the rotor pylon is rotatable, via a rotation maneuver, between a substantially horizontal orientation and a substantially vertical orientation; a linear actuator disposed to actuate the rotation maneuver; and a mechanical guide disposed to maintain a center of gravity along a substantially linear axis throughout the rotation maneuver.

BRIEF DESCRIPTION OF THE DRAWINGS

To provide a more complete understanding of the present disclosure and features and advantages thereof, reference is made to the following description, taken in conjunction with the accompanying FIGURES, in which like reference numerals represent like elements.

DETAILED DESCRIPTION

Figure 1A:
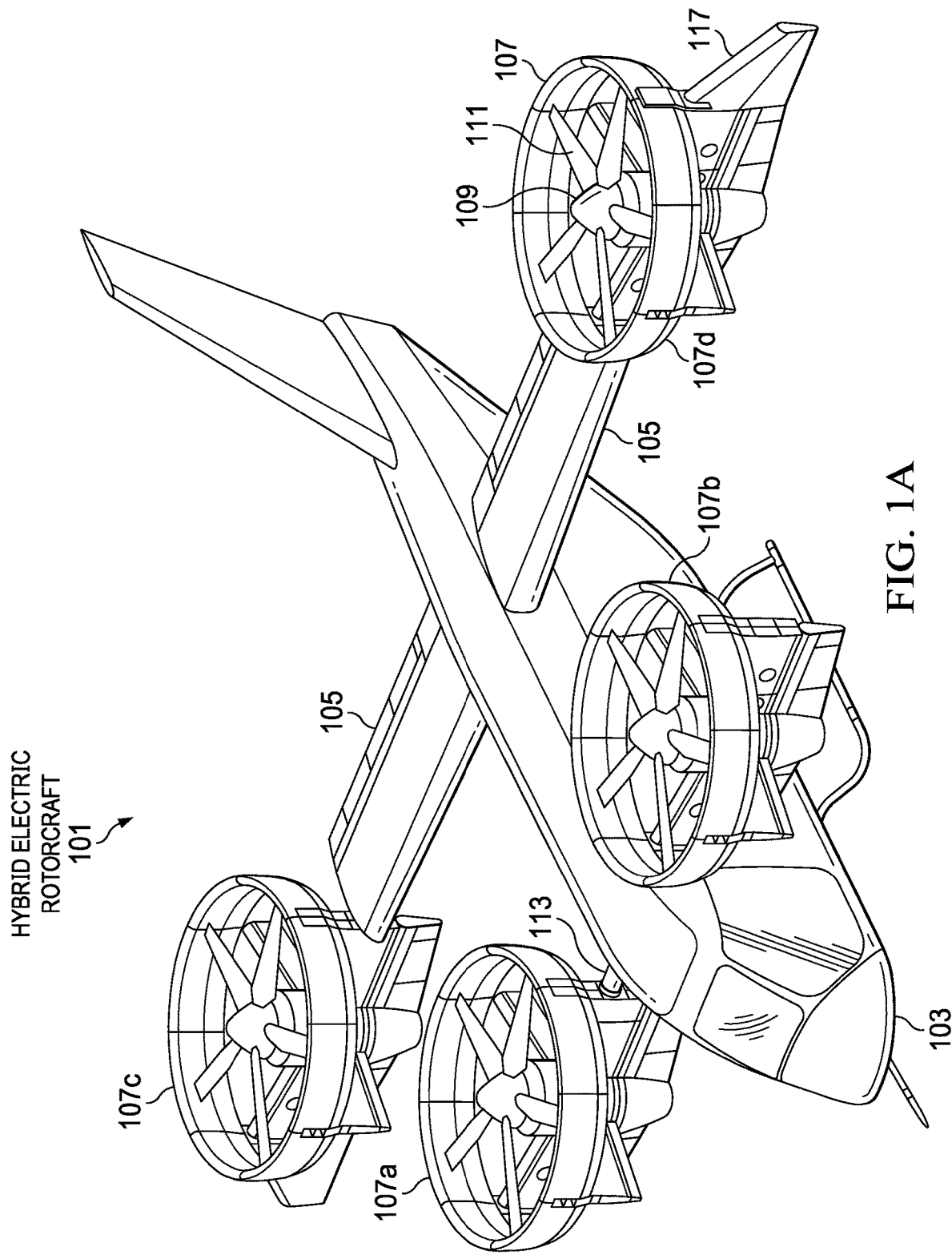
FIG. 1A is an oblique view of selected elements of a hybrid electric rotorcraft.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure.

In the present specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this specification, the terms "forward," "aft," "inboard," and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed.

Overview

One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft. Yet another type of VTOL aircraft is commonly referred to as a "tail-sitter." As the name implies, a tail-sitter takes off and lands on its tail, but tilts horizontally for forward flight.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based controller, and a system of communication between the vehicle and controller.

Aircraft are generally used for high-speed direct transport of passengers and/or cargo. Uneven loading of such passengers and/or cargo can affect the center of gravity ("CG") of an aircraft, which may affect flight characteristics and performance of the aircraft. Fixed-wing aircraft offer advantages over rotorcraft in that they are capable of longer range and more efficient flight. In contrast, rotorcraft have the distinct advantage of vertical takeoff and landing, hover, sideward, rearward, and forward flight, which allows for precise landing in space-restricted or otherwise obstructed landing zones in addition to precise maneuvering to and from such landing zones. Tiltrotors and tail-sitters enjoy the advantages of both fixed-wing aircraft and rotorcraft; however, they are especially sensitive to changes in weight and CG.

Tiltrotor aircraft are a species of rotorcraft that operate in a hybrid "helicopter" mode or "airplane" mode. The helicopter mode is used for vertical takeoff and landing and uses the rotors oriented upward, providing lift substantially perpendicular to the ground plane. In this configuration, the tiltrotor aircraft can take off, land, or hover like a helicopter. In airplane mode, the rotors tilt forward until they are providing thrust substantially parallel with the ground plane. This provides lift over the wings, and the tiltrotor aircraft may be able to realize substantially higher air speeds than a traditional helicopter. In airplane mode, the tiltrotor aircraft also has performance characteristics more similar to a fixed wing aircraft.

During the tilt maneuver, the rotor nacelle's center of gravity moves in an arc about a fixed point. This change in the rotor nacelle's center of gravity location causes longitudinal movement of the aircraft's center of gravity. The aircraft may experience a problematic weight distribution, difficult handling or may have less than optimal aerodynamic characteristics due to this movement of the aircraft center of gravity. This may occur even if the CG ultimately lands where it is intended to be. In particular, it may be desirable to perform the tilt maneuver such that rotor nacelle's center of gravity moves in a more linear vertical manner in order to provide less impact to the aircraft center of gravity between helicopter and airplane flight modes.

In larger traditional tiltrotor aircraft, such as the V-22 Osprey, the engines are mounted inside of the rotor nacelle in a manner that reduces the aircraft's center of gravity movement.

Other types of aircraft may not have the weight of the engine mounted inside the rotor nacelle. For example, an electric or hybrid electric tiltrotor aircraft may have only a smaller and lighter electric motor mounted within the rotor nacelle. Rather than a driveshaft driving the rotor, electrical wires may simply deliver power to the smaller electric motor which turns the rotors. Thus, it is desirable to provide an electric or hybrid electric rotorcraft configuration that minimizes for longitudinal center of gravity shift in the tiltrotor during the tiltrotor maneuver.

Throughout the remainder of this specification, a hybrid electric tiltrotor aircraft is used as an illustrative example for the teachings of the present specification. This hybrid electric tiltrotor aircraft in its various configurations should be understood to also represent an electric aircraft which may benefit from the same teachings. Furthermore, the teachings herein could be adapted to a purely mechanical power plant in which a driveshaft is used to drive the tiltrotors rather than electric engine.

In the hybrid electric configuration, the tiltrotor aircraft includes a mechanical engine that burns a traditional fuel, such as jet fuel or some other petrochemical fuel. However, unlike a traditional aircraft, this engine does not directly drive a drivetrain to turn the rotors. Rather, the engine may instead power an electric generator. The electric generator may then distribute electric power to various parts of the aircraft, including to electric motors that drive the rotors. In an illustrative embodiment, the electric motors mount directly or very near to the rotors so that longer mechanical driveshafts are unnecessary. A purely electrical system could also be provided. Pure electric and hybrid electric systems have various advantages and disadvantages. For example, a pure electric system may use rechargeable batteries and requires no chemical fuel. On the other hand, petrochemical fuels tend to have higher density than known battery configurations, and so a hybrid electric system may have greater range and greater cargo capacity than a pure electric system. The teachings of the present specification may also be adapted to other types of systems, such as systems that use alternative fuel sources such as solar power, bioelectric power, fuel cells, or nuclear power (such as a radioisotope thermal generator that may be used to recharge the battery), or other power sources. Although certain types of power plants, such as pure electric and hybrid electric, may benefit specifically from the teachings of the present specification, the present specification does not require a particular powerplant or type of powerplant.

To reduce the longitudinal shift in the aircraft's CG, embodiments of the present specification may use various mechanical means to reduce the longitudinal movement of the rotor nacelle CG during the tiltrotor maneuver. In these examples, the rotor nacelle CG shifts upward with the nacelle as the nacelle rotates upward. But longitudinal shift of the CG (e.g., shift of the CG relative to the wing) is eliminated or minimized. Various embodiments of mechanical means for accomplishing this are illustrated herein. In one example, a cam slot is engaged by a cam pin of the rotor nacelle. The cam slot is shaped, for example, in a substantial U shape that causes an offset in the nacelle during a tiltrotor maneuver. This cam slot can be precisely designed and disposed so that the tiltrotor nacelle experiences no longitudinal shift of the CG during the tiltrotor maneuver.

Although the cam slot described above can realize a theoretically perfect configuration in which there is zero longitudinal shift in the CG, the solution may require intricate design work and intricate manufacturing to provide the exact correct cam slot. In some configurations, such intricate design and manufacturing may be incompatible with real-world design goals, such as production time and affordability. In that case, a trade-off may be provided in the form of an alternative configuration that uses a link strut instead of the cam slot. The link strut can be designed such that there is very little longitudinal shift as a linear actuator drives a slot pin along a guide slot that is disposed on either side of a tip rib of the wing. In real-world applications, this may not realize perfect maintenance of the nacelle's CG location with respect to the wing but may minimize longitudinal CG shift to an acceptable degree, such that aircraft operation is not compromised. In yet another embodiment, dual linear actuators are provided to enhance the stability of the solution.

Description of the Drawings

A system and method for providing predictive preconditioning of an electric aircraft battery system will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1A is an oblique view of a ducted-rotor aircraft 101 in a tiltrotor configuration. Aircraft 101 may be, for example, an "air taxi" that may be used to ferry passengers, or may be configured for cargo, sightseeing, research, or other uses. Aircraft 101 may be a purely mechanical aircraft, a purely electrical aircraft, or a hybrid electric aircraft, by way of illustrative example. In this specification, aircraft 101 is illustrated as a hybrid-electric aircraft to illustrate certain teachings of this specification.

Aircraft 101 comprises a fuselage 103 with a fixed wing 105 that extends therefrom and a plurality of rotatable ducts 107. Each duct 107 houses a power plant for driving an attached rotor 109 in rotation. The power plant may be, by way of illustration, a mechanical engine, an electric motor, or other drive means. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each independently coupled to a corresponding end of wing 105 via respective spindle. As shown, each of ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107.

Hybrid electric aircraft 101 may have an electric or hybrid electric power plant and may benefit from the teachings of the present specification. In particular, the rotor nacelles for the tiltrotors 107 may have relatively light electric motors instead of relatively heavy mechanical engines. Thus, hybrid electric rotorcraft 101 may benefit from the teachings of this present specification wherein longitudinal shift of the CG is minimized during the tiltrotor maneuver.

Figure 1B:
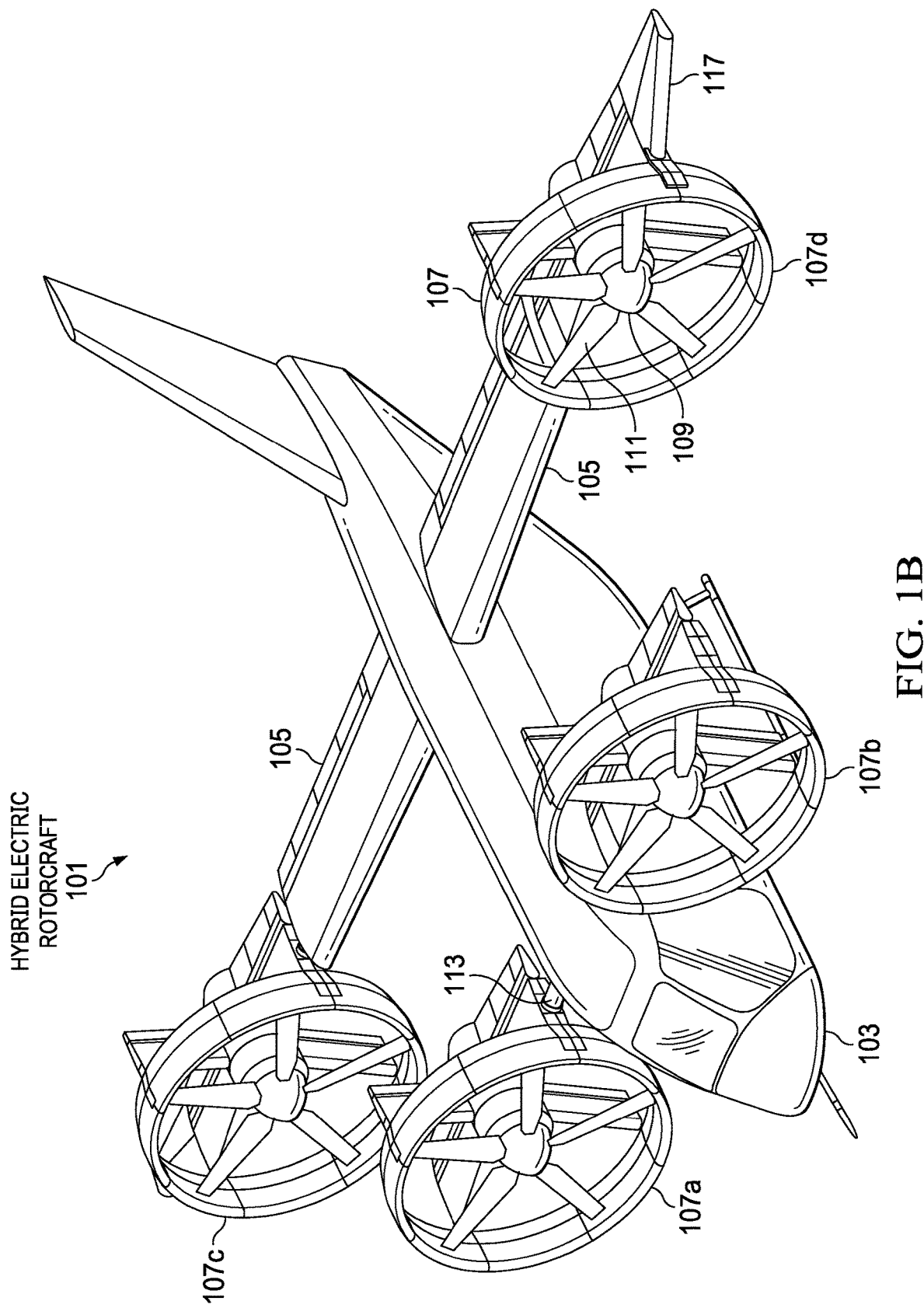
FIG. 1B illustrates the same aircraft in an airplane configuration.
Figure 2:
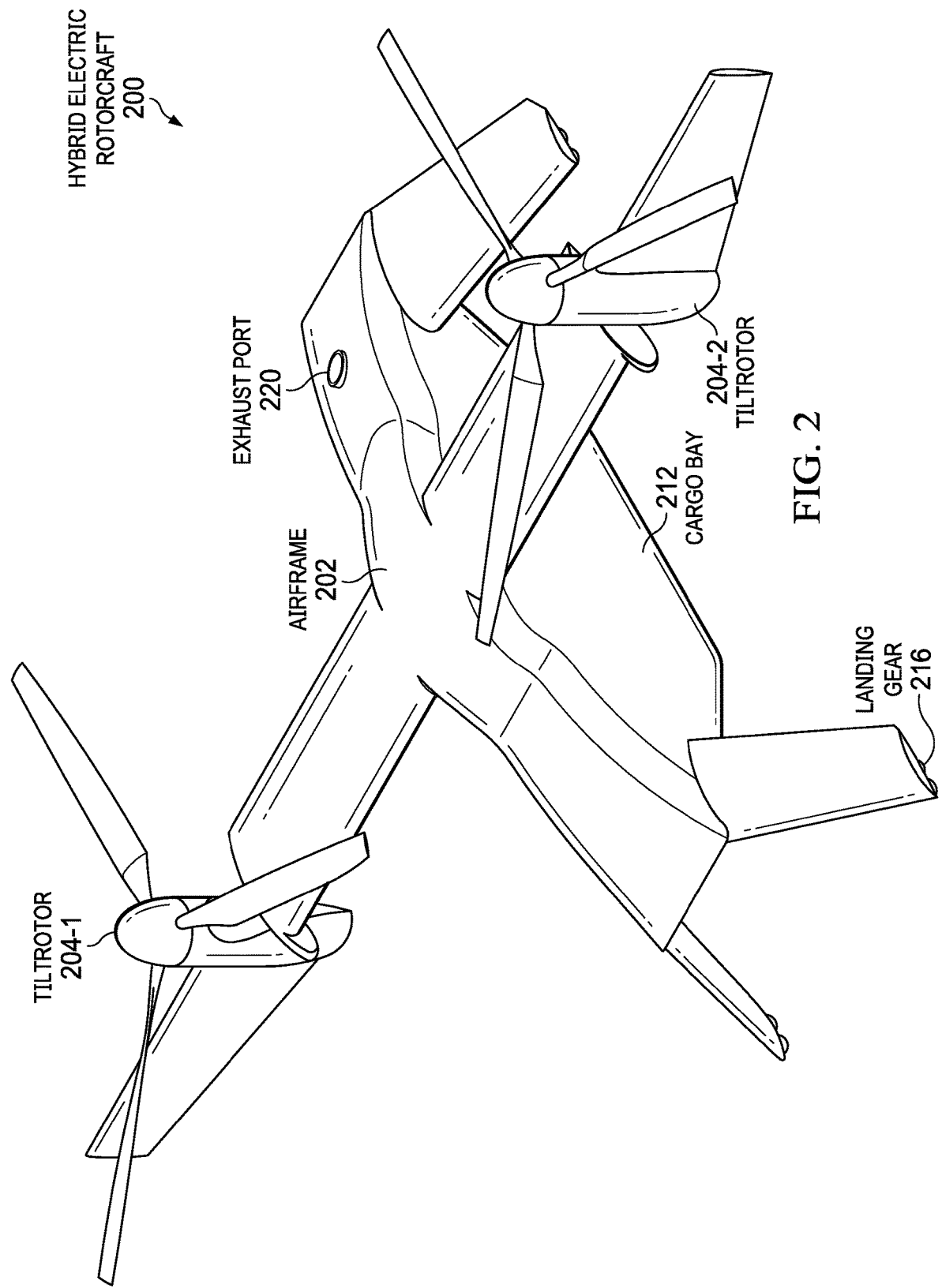
FIG. 2 is a perspective view illustration of a hybrid electric rotorcraft.

FIG. 1B illustrates the same aircraft 101 in an airplane configuration. In this configuration, ducts 107 are oriented in a horizontal pitch, which provides greater forward thrust at the expense of hover capability. In an illustrative operation, aircraft 101 may begin in helicopter mode for takeoff (as illustrated in FIG. 1), convert to airplane mode for cruise (as illustrated in FIG. 2), and then revert to helicopter mode for vertical landing. Alternatively, if sufficient runway length is available, aircraft 101 may operate exclusively in airplane mode. In another example, for example a short flight with a heavy or less stable payload, aircraft 101 may operate exclusively in helicopter mode.

FIG. 2 is a perspective view illustration of a hybrid electric rotorcraft 200. In this example, hybrid electric rotorcraft 200 is configured to carry cargo rather than passengers. Furthermore, hybrid electric rotorcraft 200 may be an unmanned hybrid electric rotorcraft.

In this example, hybrid electric rotorcraft 200 includes an airframe 202. Airframe 202 may provide the mechanical and structural form factor of rotorcraft 200 and may also provide an enclosure for internal components. Rotorcraft 200 may be powered by a hybrid electric system which includes a mechanical engine that drives an electric generator. Exhaust from the mechanical engine may vent via exhaust port 220.

Rotorcraft 200 also includes a cargo bay 212 and landing gear 216 which, in this illustration, are illustrated as landing feet. Other types of landing gear could also be provided.

Hybrid electric rotorcraft 200 includes two tiltrotors 204-1 and 204-2. As discussed herein, during the rotation maneuver, tiltrotors 204 may experience an offset in their center of gravity. Thus, it may be desirable to reconfigure hybrid electric rotorcraft 200 according to the teachings of the present specification to provide a configuration that eliminates or minimizes longitudinal shift in the CG during the tiltrotor maneuver.

Figure 3:
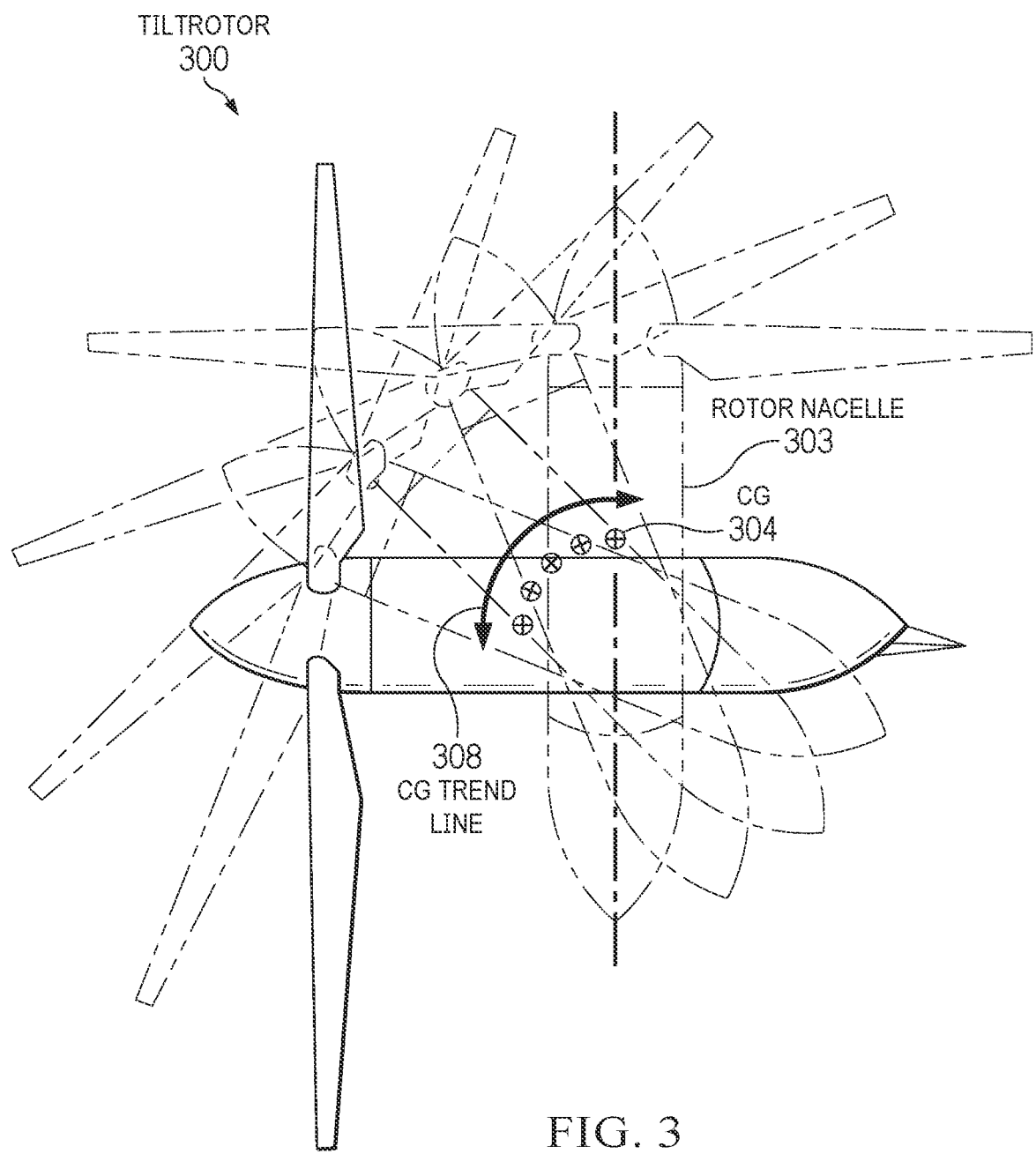
FIG. 3 is a perspective view illustration of a CG shift during a tiltrotor maneuver.

FIG. 3 is a perspective view illustration of a rotor nacelle CG shift during a tiltrotor maneuver. In this example, tiltrotor 300 moves from a substantially horizontal position (or substantially parallel to the ground plane) to a substantially vertical position (or substantially perpendicular to the ground plane).

At the beginning of this tiltrotor maneuver, center of gravity 304 is located at a particular point relative to the wing. As tiltrotor 300 moves from the horizontal to the vertical position, rotor nacelle CG 304 follows a CG trendline 308 in which CG 304 moves from its position in the horizontal plane of the wing to a position above the wing. This final position with the CG elevated and in line with rotor nacelle 303 and above rotor nacelle 303 is desirable during the hover maneuver. However, in at least some embodiments, it is also desirable to maintain CG 304 in substantially the same longitudinal position but lower when the rotorcraft is in the airplane mode with the nacelle substantially horizontal.

Figure 4:
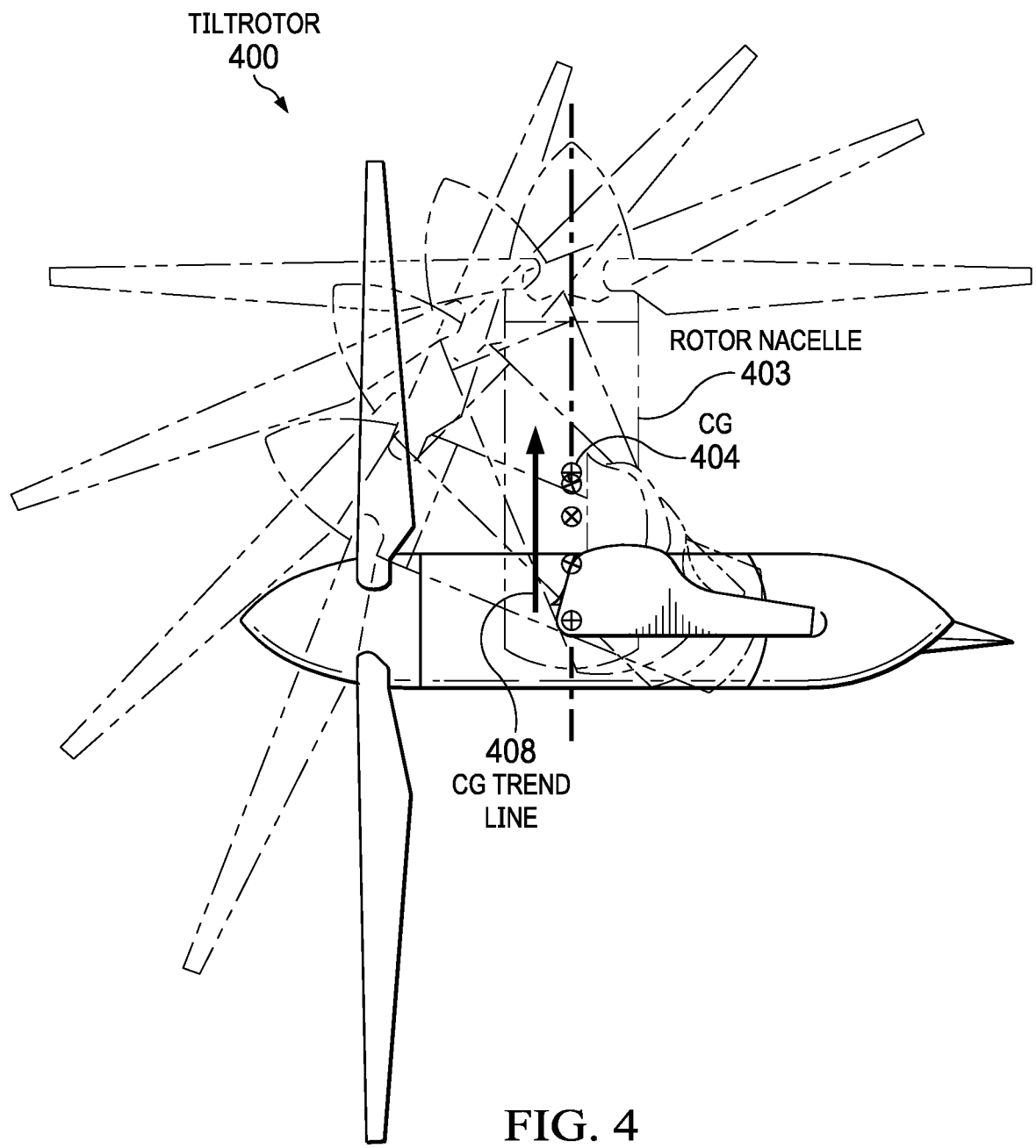
FIG. 4 is a perspective view illustration of the desired CG orientation for the hybrid electric tiltrotor aircraft of the present specification.

FIG. 4 is a perspective view illustration of the desired rotor nacelle CG orientation for the hybrid electric tiltrotor aircraft of the present specification. In this case, tiltrotor 400 is disposed within rotor nacelle 403. In this case, CG trendline 408 moves directly up and down. This represents a theoretically ideal configuration in the case where it is desirable to have the CG remain in the same longitudinal orientation. In this case, when rotor nacelle 403 is in the vertical position, CG 404 is in line with rotor nacelle 403 and elevated above the wing. When rotor nacelle 403 moves to the horizontal position, CG 404 follows CG trendline 408 directly downward and remains in line with the previous vertical orientation of rotor nacelle 403. Note that CG 404 is expected to follow the same CG trendline 408 in the reverse orientation when moving the other direction.

Thus, embodiments of the present specification provide mechanical configurations that help to maintain a center of gravity that is substantially in line with the vertical orientation of a rotor nacelle and that follows a linear or close to linear trendline during the tiltrotor maneuver.

Figure 8A:
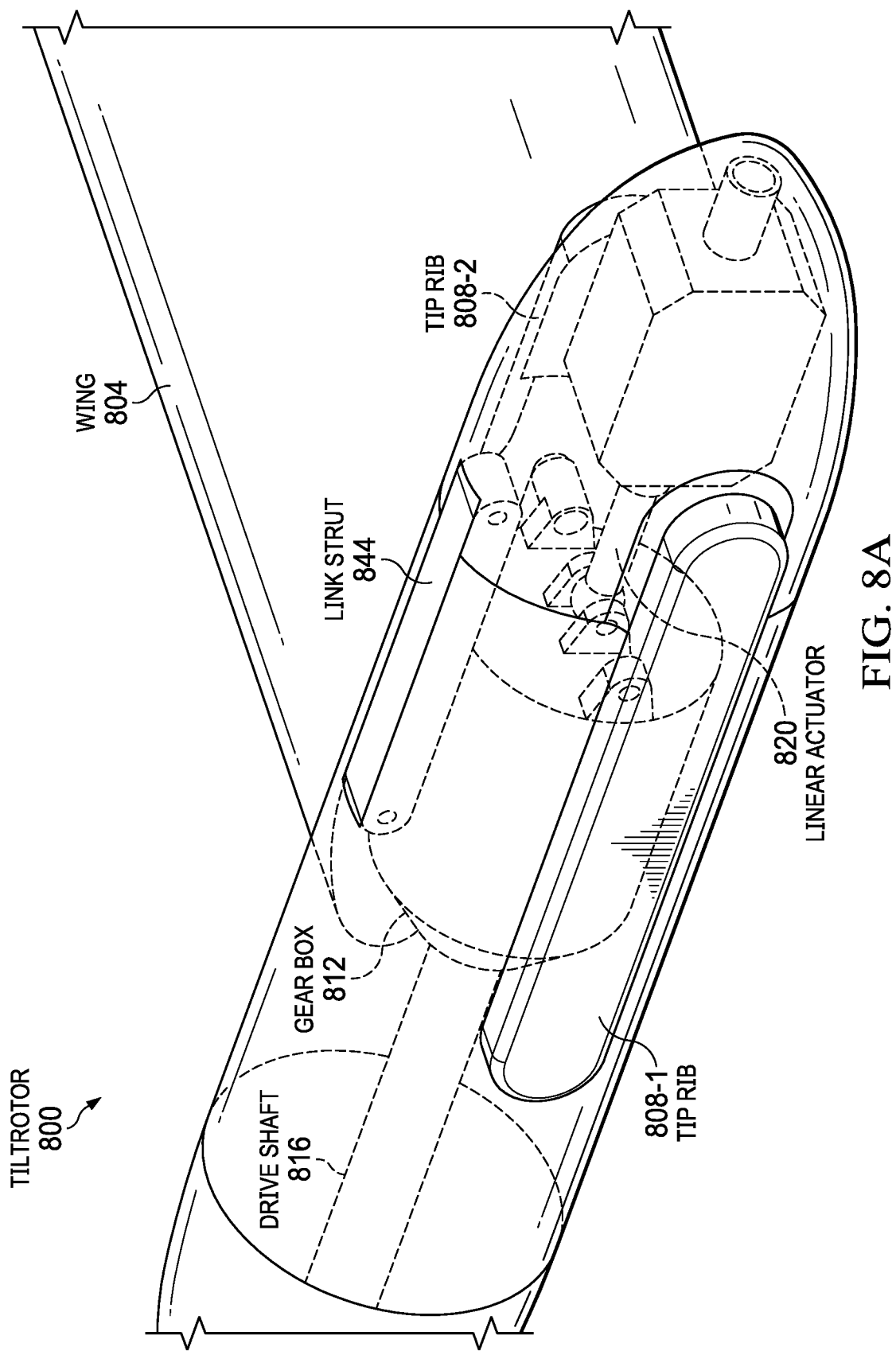
FIG. 8A illustrate an alternative configuration in which a link strut is used in place of a cam slot.
Figure 8B:
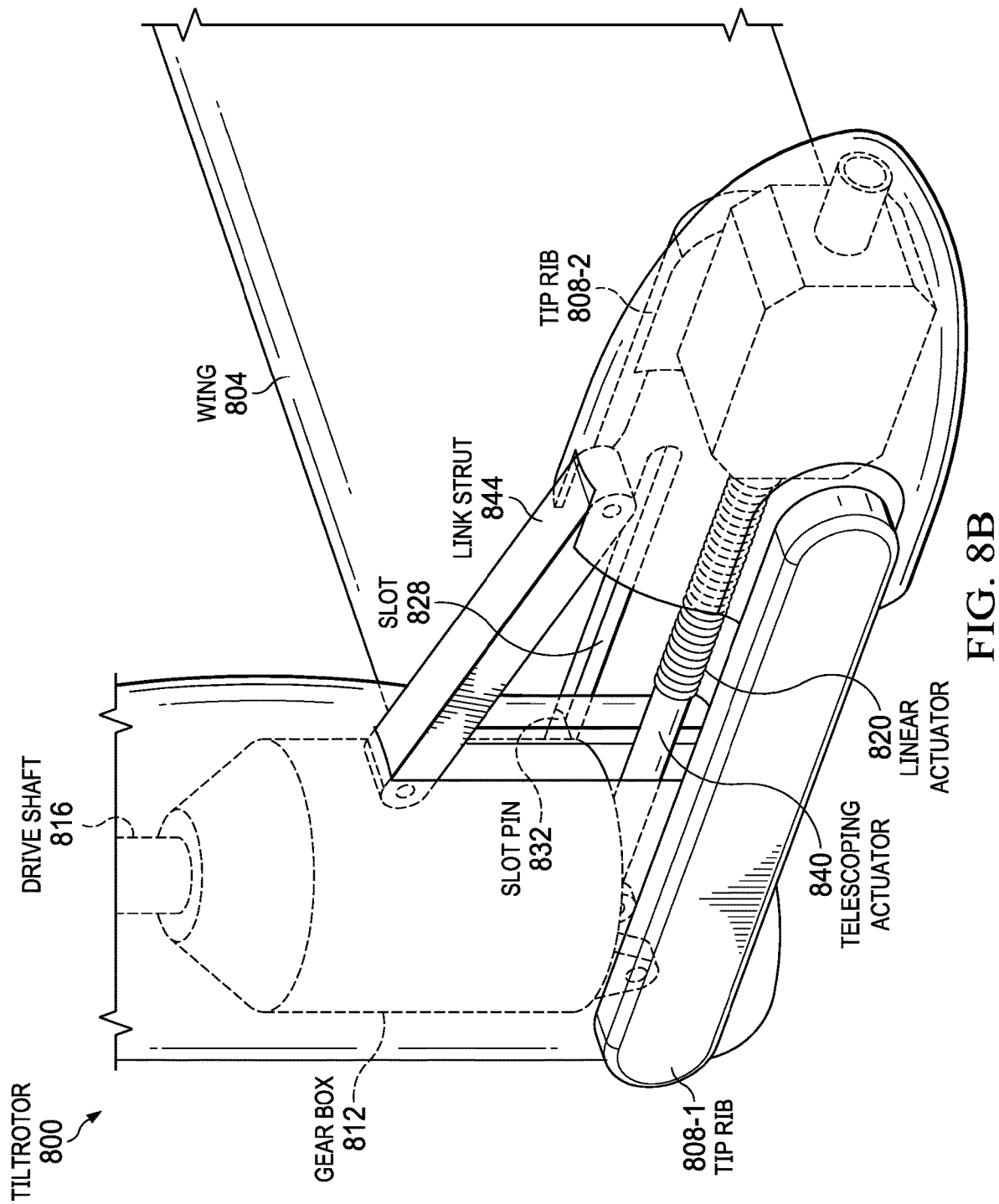
FIG. 8B illustrates an alternative configuration in vertical orientation.
Figure 9A:
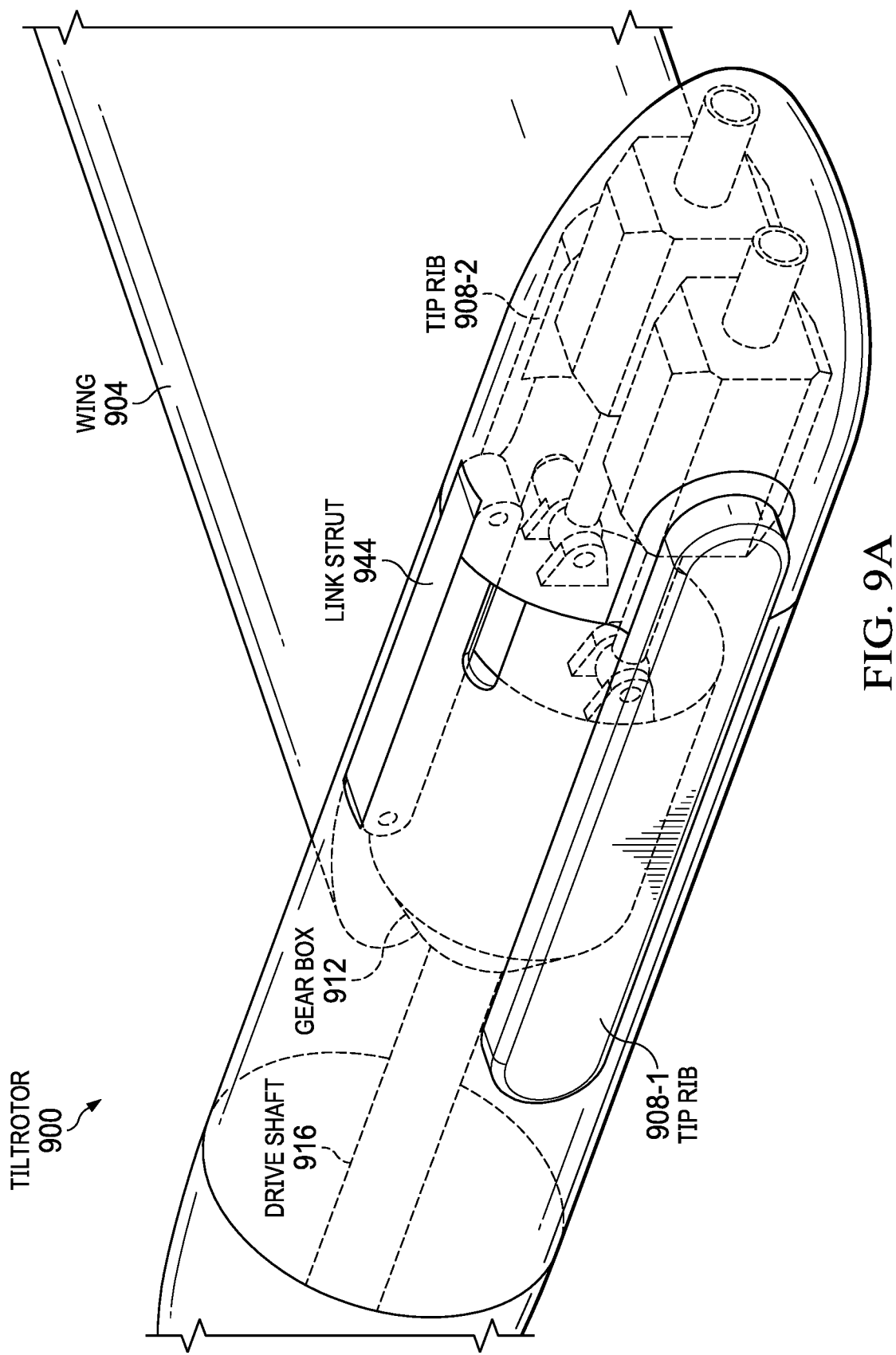
FIG. 9A is a perspective view illustration of selected elements of a tiltrotor.
Figure 9B:
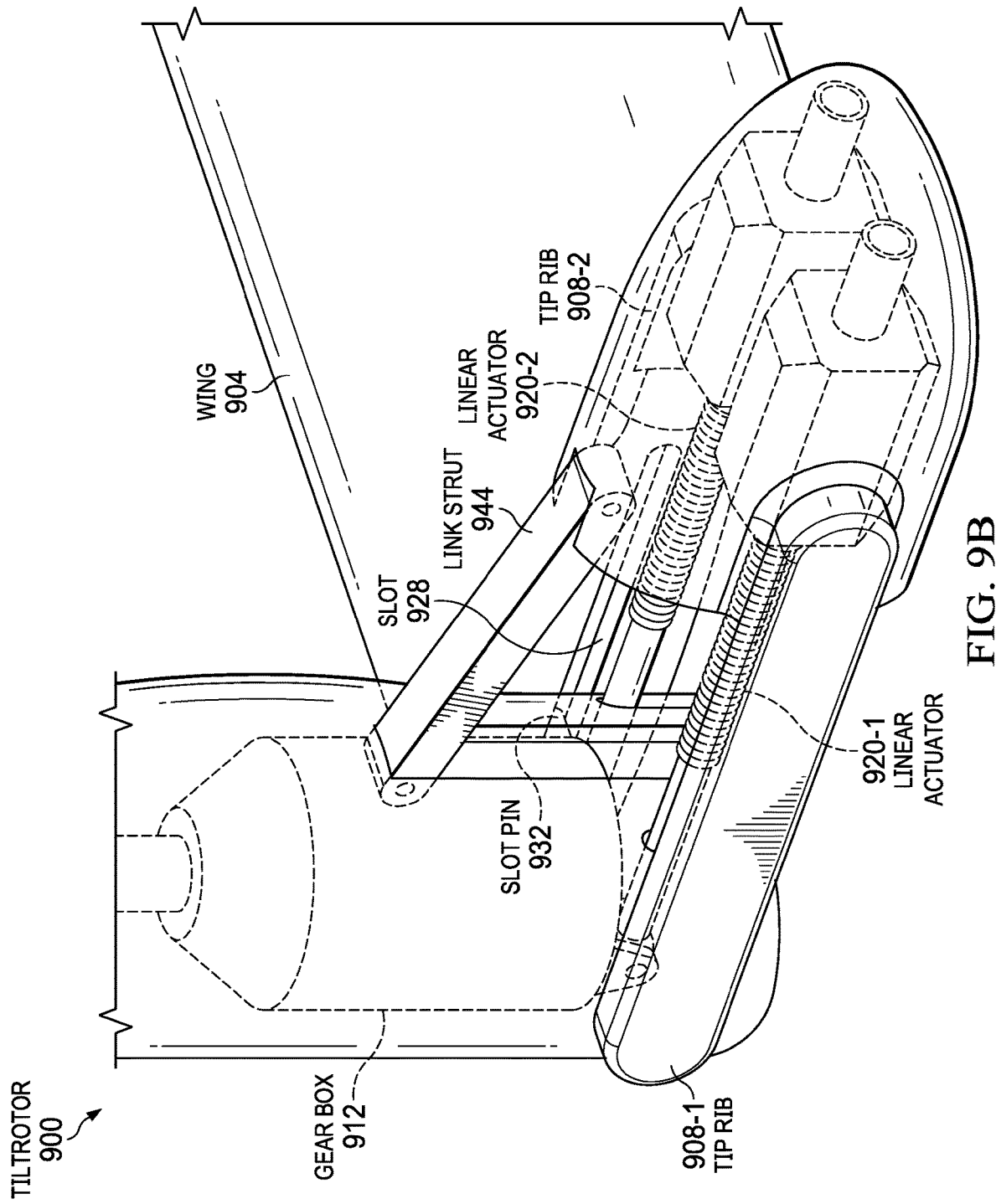
FIG. 9B is an illustration of tiltrotor with the tiltrotor in an upright or vertical configuration.
Figure 10A:
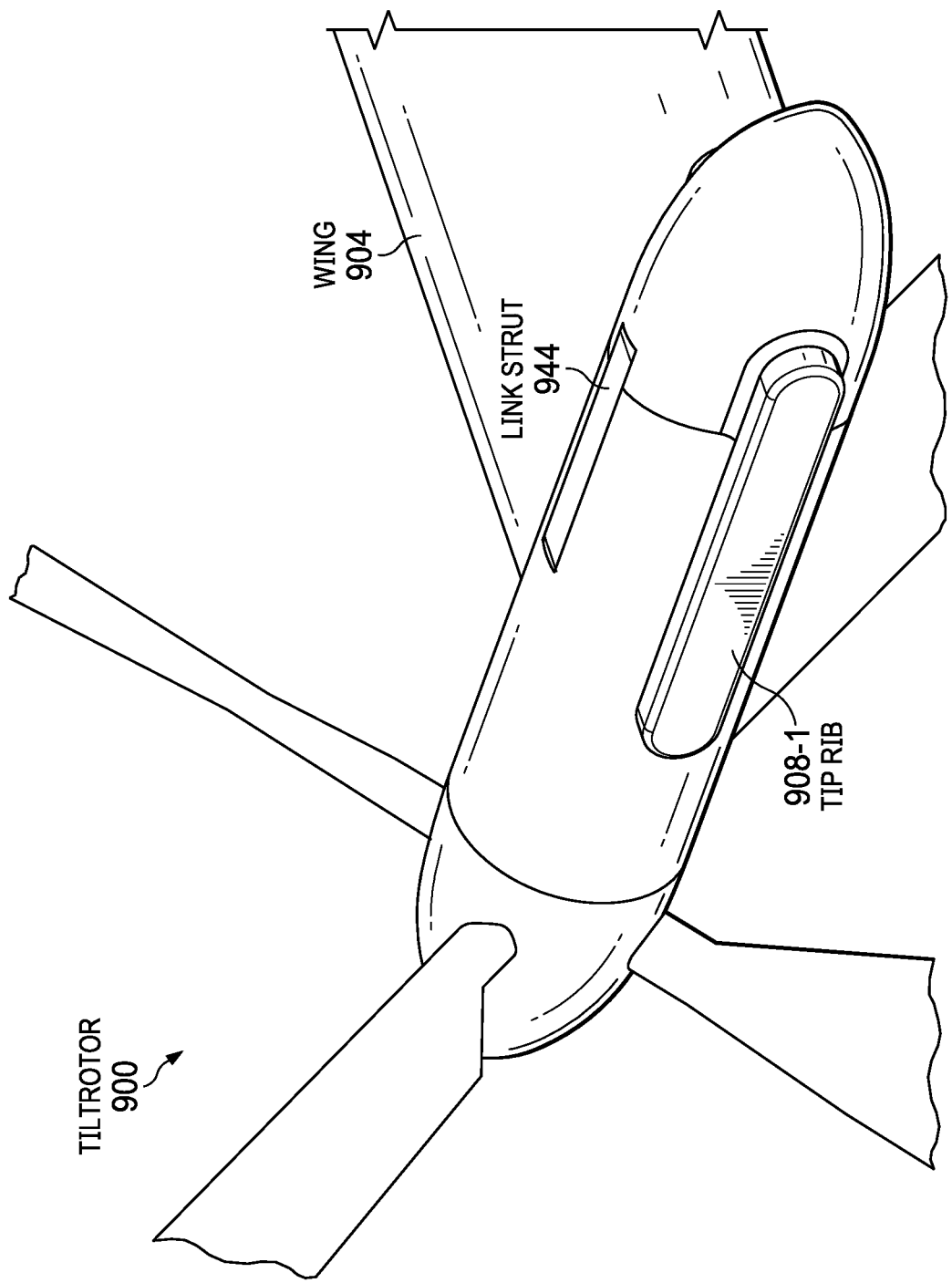
FIG. 10A illustrate operation of tiltrotor in a full vertical or forward configuration.

FIGS. 5A through 7 below illustrate an embodiment that uses a cam slot as a mechanical means to realize a vertical CG trendline. FIGS. 8A and 8B illustrate an embodiment with a link strut and a single linear actuator. FIGS. 9A and 9B illustrate an alternative embodiment with a link strut and dual linear actuators. FIGS. 10A through 11 illustrate the motion and the nearly vertical CG trendline realized by the configurations illustrated in FIGS. 8A through 9B.

Figure 5A:
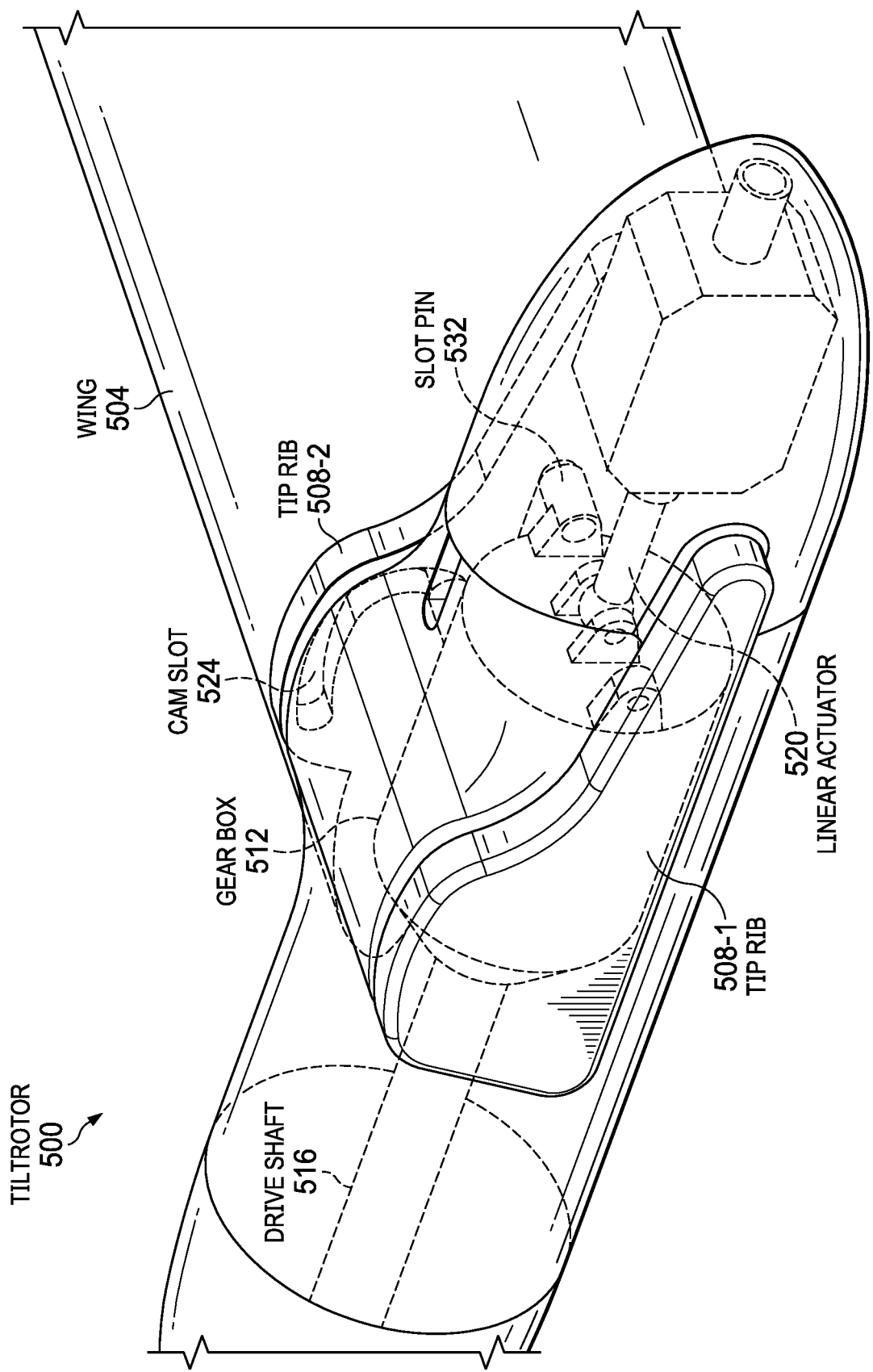
FIG. 5A is a cutaway perspective view of selected elements of a tiltrotor aircraft.

FIG. 5A is a cutaway perspective view of selected elements of a tiltrotor aircraft. This includes a tiltrotor assembly 500 mounted to a wing 504. Tip rib 508-1 and tip rib 508-2 provide structural support exterior to the tiltrotor assembly. For example, tip rib 508-1 and tip rib 508-2 may be structural members of wing 504. For clarity of the illustration, mechanical connection between tip rib 508-1 and wing 504 are not shown in this figure. However, tip rib 508-1 may be considered part of wing 504 and is a structural element.

A gearbox 512 may include an electric motor which may have gears that turn a driveshaft 516 that turns the rotor of tiltrotor 500.

A linear actuator 520 engages gearbox 512. Gearbox 512, in this example, includes a slot pin 532. Slot pin 532 may engage a slot which is not clearly visible in this illustration but is shown in other illustrations. The slot is disposed within tip rib 508-2 along with a cam slot 524. A cam pin 536 engages cam slot 524. Cam slot 524 has a substantial U.

shape that may be specifically configured to provide a longitudinal, upward-moving CG when tiltrotor 500 moves from its present horizontal position to a vertical position.

Tip rib 508-1 may also include a matching cam slot that is engaged by matching slot pins and cam pins. Because of the orientation of the illustration, these are not visible in the current figure.

Figure 5B:
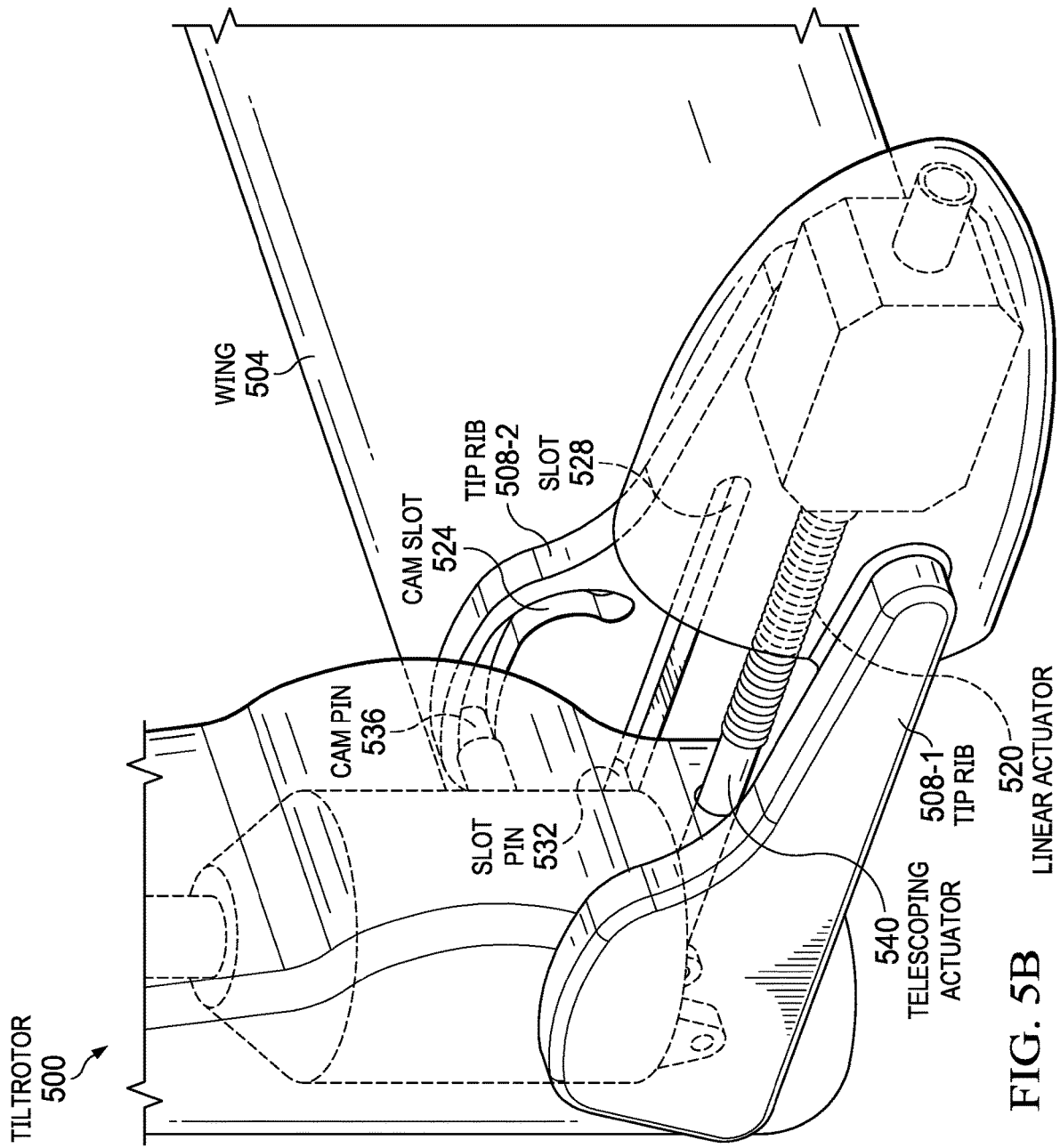
FIG. 5B illustrates the same mechanical configuration with tiltrotor in a vertical orientation.

FIG. 5B illustrates the same mechanical configuration with tiltrotor 500 in a vertical orientation. In this illustration, slot 528 is more readily visible as is linear actuator 520. Further, in this configuration, a telescoping actuator 540 may also be provided with linear actuator 502. This may be provided in cases where the horizontal run of linear actuator 520 exceeds the length that can reasonably be handled by a single actuator shaft or rod.

Linear actuator 520 may be any suitable linear actuator, including a screw, a hydraulic actuator, a pneumatic actuator, a spring, or other.

As illustrated in this figuration, cam pin 536 slots into cam slot 524 while slot pin 532 slots into slot 528. Slot 528 provides a guided linear displacement for tiltrotor 500. Cam slot 524 is provided to guide that longitudinal displacement. Specifically, cam slot 524 displaces tiltrotor 500 during the longitudinal motion and can be precisely shaped and configured so as to maintain the CG of tiltrotor 500 in the same horizontal or longitudinal position. Thus, as tiltrotor 500 performs the tiltrotor maneuver, moving from a horizontal disposition to a vertical disposition, the CG of tiltrotor 500 need not experience any longitudinal displacement.

Figure 6A:
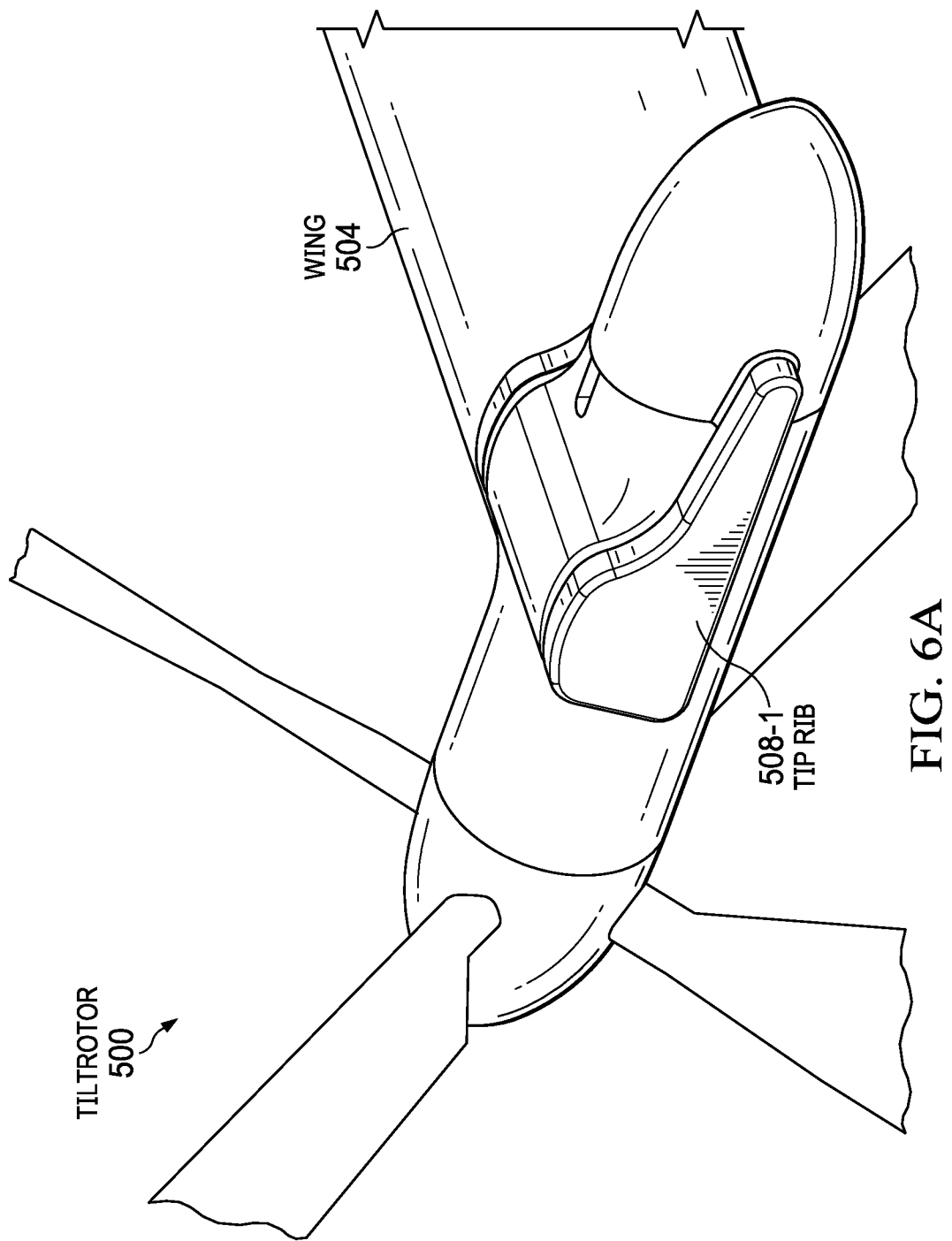
FIG. 6A is an exterior perspective view of tiltrotor 500. Visible in this FIGURE are wing 504 and tip rib 508.

FIG. 6A is an exterior perspective view of tiltrotor 500. Visible in this FIGURE are wing 504 and tip rib 508. This shows tiltrotor 500 in a horizontal position, such as when the tiltrotor aircraft is operating in airplane mode.

Figure 6B:
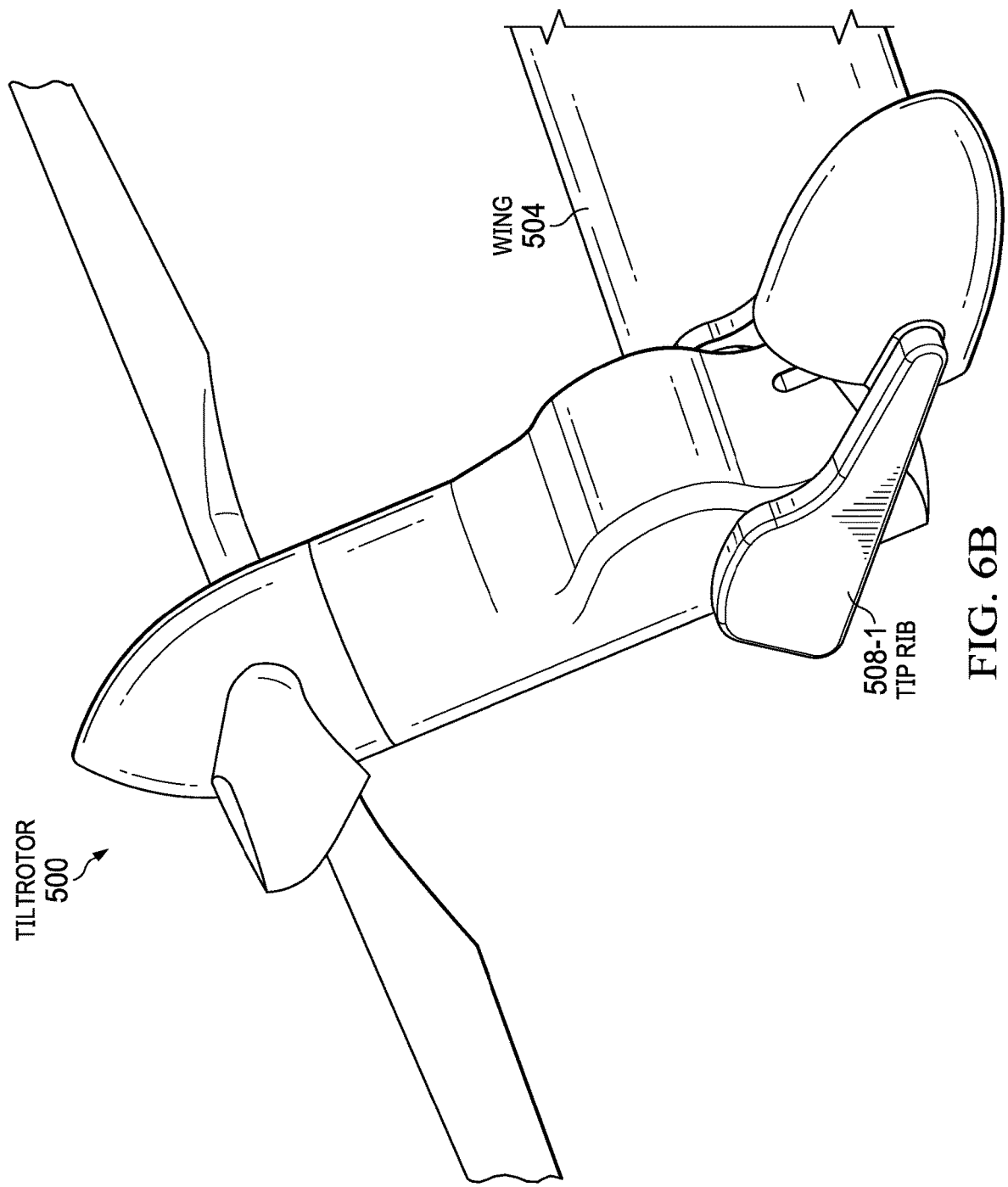
FIG. 6B illustrates an intermediate displacement of tiltrotor.

FIG. 6B illustrates an intermediate displacement of tiltrotor 500. In this case, tiltrotor 500 has begun moving from its horizontal position toward its vertical position but has not yet reached the full vertical position. It is seen in this FIGURE that tiltrotor 500 may not pivot straight up and down, but the cam configuration may cause some displacement of tiltrotor 500 so as to maintain the longitudinal position of the center of gravity.

Figure 6C:
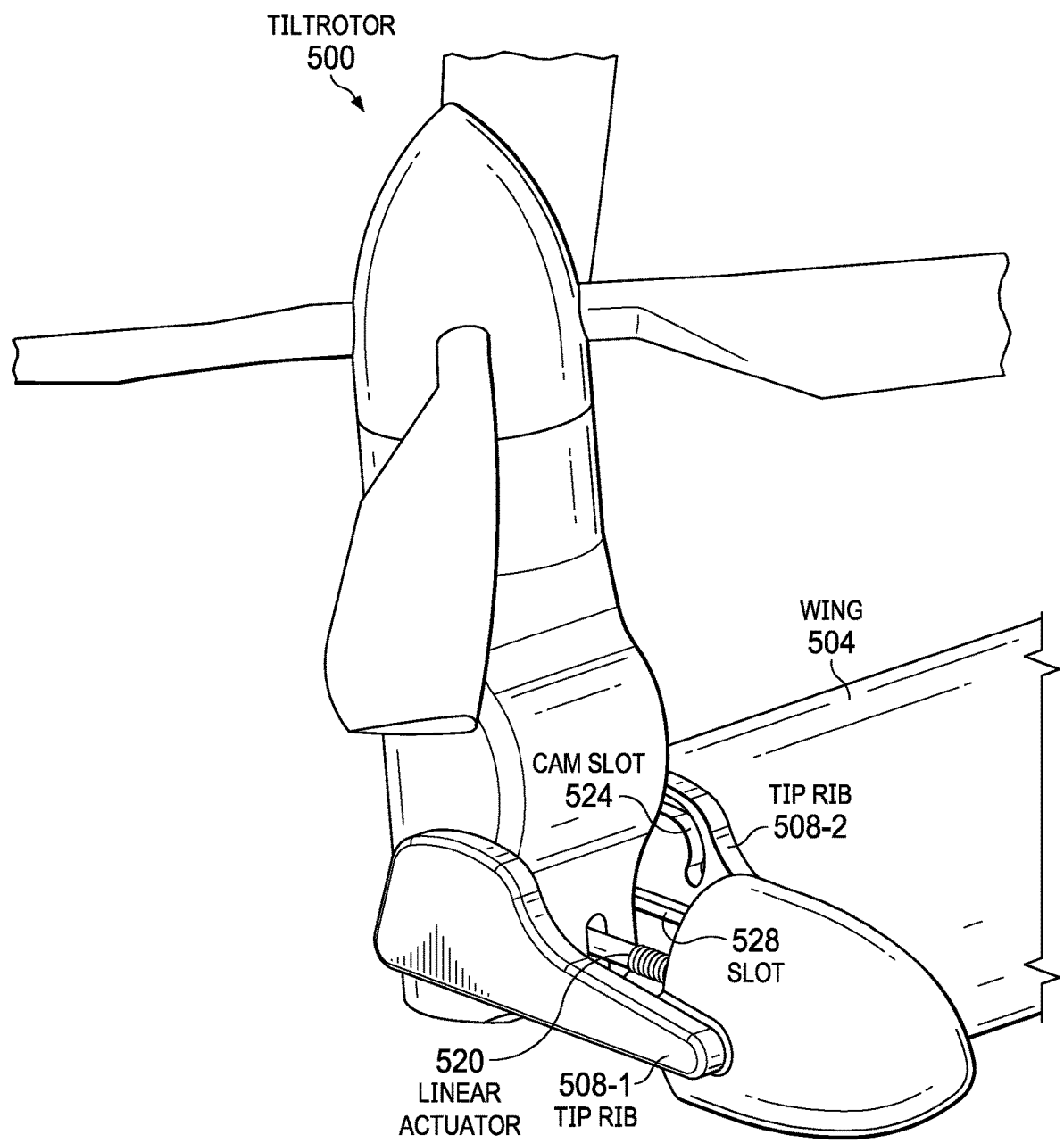
FIG. 6C illustrates tiltrotor in its full upright or vertical position.

FIG. 6C illustrates tiltrotor 500 in its full upright or vertical position. Here, cam slot 524 is slightly visible within tib rib 508-2. A matching cam slot 524 is also disposed in tip rib 508-1. Slot 528 is also visible in this view, and a matching slot in tip rib 508-1 is not readily visible in this view. Here, it is seen that linear actuator 520 has shifted tiltrotor 500 forward and also caused it to rotate vertically.

Figure 7:
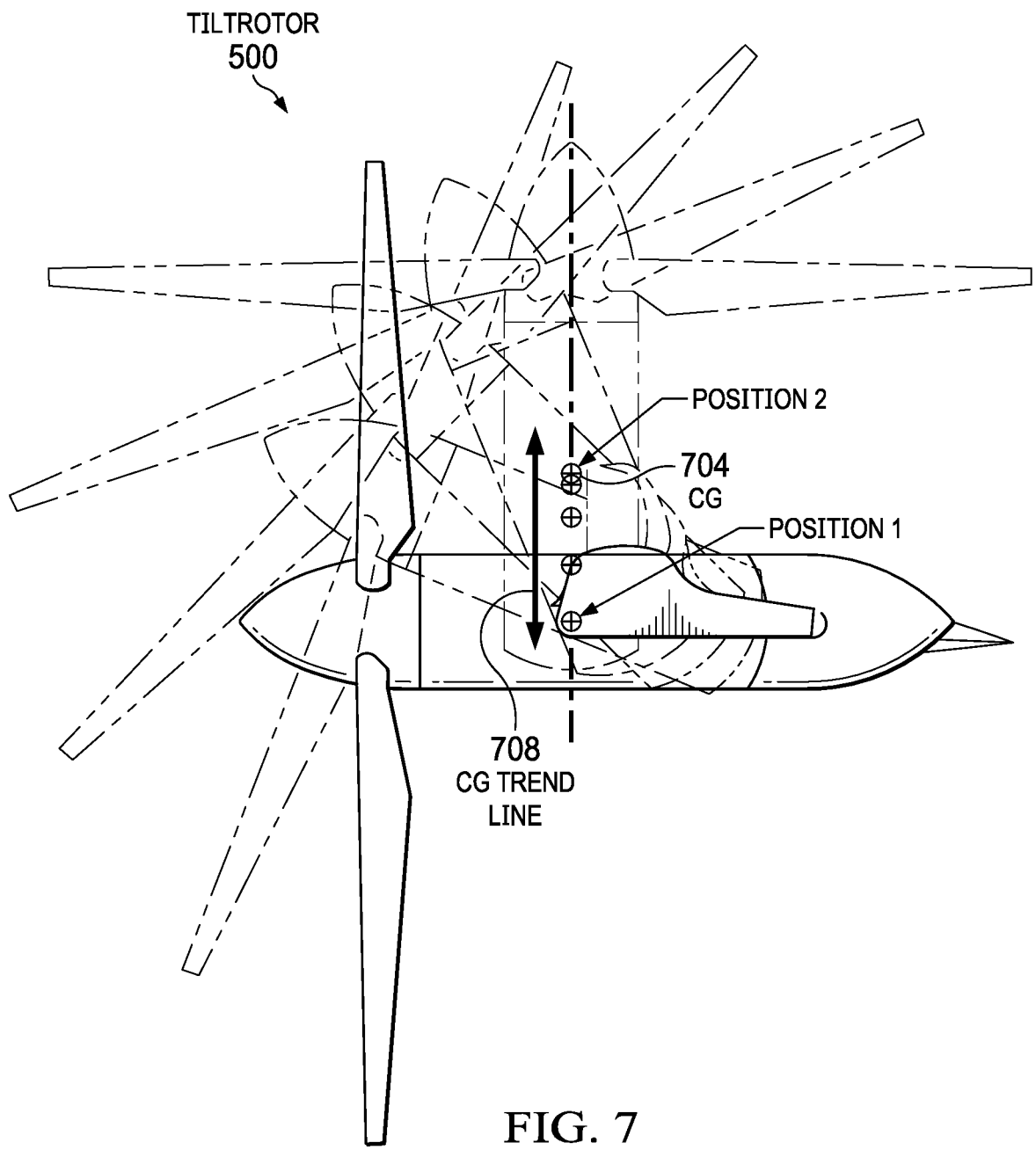
FIG. 7 is an illustration of CG movement within tiltrotor during the tiltrotor maneuver.

FIG. 7 is an illustration of CG movement within tiltrotor 500 during the tiltrotor maneuver. As illustrated here, CG 704 follows CG trendline 708. When the tiltrotor aircraft is in the airplane mode, CG 704 begins at position 1.

As tiltrotor 500 moves through the tiltrotor maneuver, CG 704 shifts upward ultimately landing in position 2 when tiltrotor 500 is in the full upright or vertical position. Following trendline 708, it is seen that tiltrotor 500 can be mechanically configured via the cam mechanism to follow a perfectly linear trendline that experiences no longitudinal displacement (i.e. displacement toward the forward part of tiltrotor 500 or toward the aftward part of tiltrotor 500). Rather, the cam mechanism can be configured to provide a perfectly vertical CG trendline 708 so that between position 1 and position 2, CG 704 shifts upward but not forward or backward.

The cam configuration of FIGS. 5A through 7 provide a high precision configuration wherein the CG trendline can be maintained perfectly vertically if the cam slot is manufactured to precise dimensions and configurations. While this may be beneficial, it may not be practical in some real-world operations. For example, the manufacturing of such high precision parts may be prohibitively expensive for some applications. It may also be prohibitively time-consuming or require parts that are not readily available.

FIGS. 8A and 8B illustrate an alternative configuration in which a link strut is used in place of a cam slot. As seen in FIG. 8A, a tiltrotor 800 includes a wing 804. Wing 804 terminates at a tip rib 808-1 and tip rib 808-2. So as not to obstruct other views, mechanical interfaces between tip rib 808-1, tip rib 808-2, and wing 804 are not illustrated here, but may be present. A gearbox 812 engages a driveshaft 816 which may turn the rotor of tiltrotor 800. A linear actuator 820 mechanically engages gearbox 812 and is disposed to drive tiltrotor 800 forward and to cause longitudinal and lateral displacement of tiltrotor 800. In the configuration of FIG. 8A, tiltrotor 800 is in a horizontal position, such as when the aircraft is operating in airplane mode.

FIG. 8B illustrates additional elements of tiltrotor 800. In FIG. 8B, tiltrotor 800 is in an upright or vertical position. For example, linear actuator 820 may drive gearbox 812 forward and further cause rotational motion via link strut 844. Link strut 844 is disposed to engage gearbox 812 and to "lift" gearbox 812 to provide the rotational motion while linear actuator 820 drives it forward.

Also visible in this view is driveshaft 816, which engages gearbox 812 to turn rotors of tiltrotor 800.

A slot 828 provides a longitudinal guide for the longitudinal motion. As in FIG. 5A, a slot pin 832 engages slot 828. However, tiltrotor 800 is somewhat simpler than tiltrotor 500 of FIG. 5A in that tiltrotor 800 does not require a cam slot. Rather, link strut 844 provides the rotational motion that was previously provided by the cam slot of tiltrotor 500 of FIG. 5A.

As before, a telescoping actuator 840 may be provided with linear actuator 820 if the horizontal run of the linear actuator exceeds reasonable limits of its motion.

FIG. 9A is a perspective view illustration of selected elements of a tiltrotor 900. FIGS. 9A and 9B illustrate an alternative embodiment in which a pair of linear actuators are used instead of a single linear actuator as illustrated in FIGS. 8A and 8B. As before, a wing 904 terminates in tip ribs 908-1 and 908-2. Mechanical interfaces between tip rib 908-1, tip rib 908-2, and wing 904 are not shown for purposes of the illustration. A gearbox 912 interfaces to driveshaft 916 and may drive the rotors of tiltrotor 900. As before, a link strut 944 engages gearbox 912 to provide rotational motion.

FIG. 9B is an illustration of tiltrotor 900 with the tiltrotor in an upright or vertical configuration. In this view, slot 928, engaged by slot pin 932, is more clearly visible. As in FIG. 9B and in FIG. 5B, tip rib 908-1 may have a matching slot to slot 928. This matching slot is not ready be readily visible so as to better illustrate other elements that may be provided. The slot within tip rib 908-1 may be mated to a matching slot pin on an opposite side of gearbox 912 from slot pin 932.

In this example, two linear actuators are illustrated, namely linear actuator 920-1 and linear actuator 920-2. The use of dual linear actuators 920 may provide benefits, such as preventing binding, preventing a smoother motion, and better guiding slot pins 932 within slots 928.

Figure 10B:
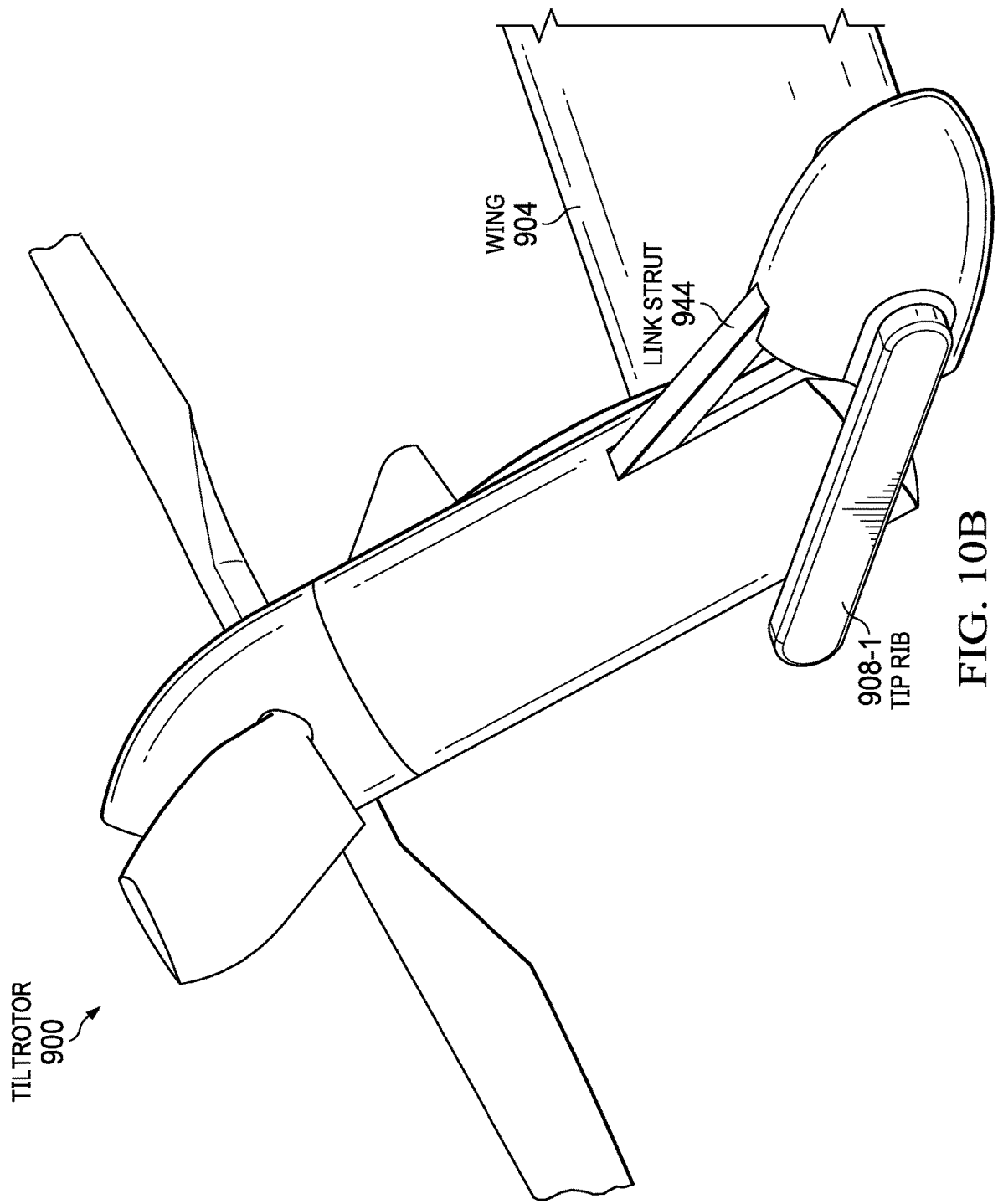
FIG. 10B illustrates an intermediate view of the tiltrotor maneuver.
Figure 10C:
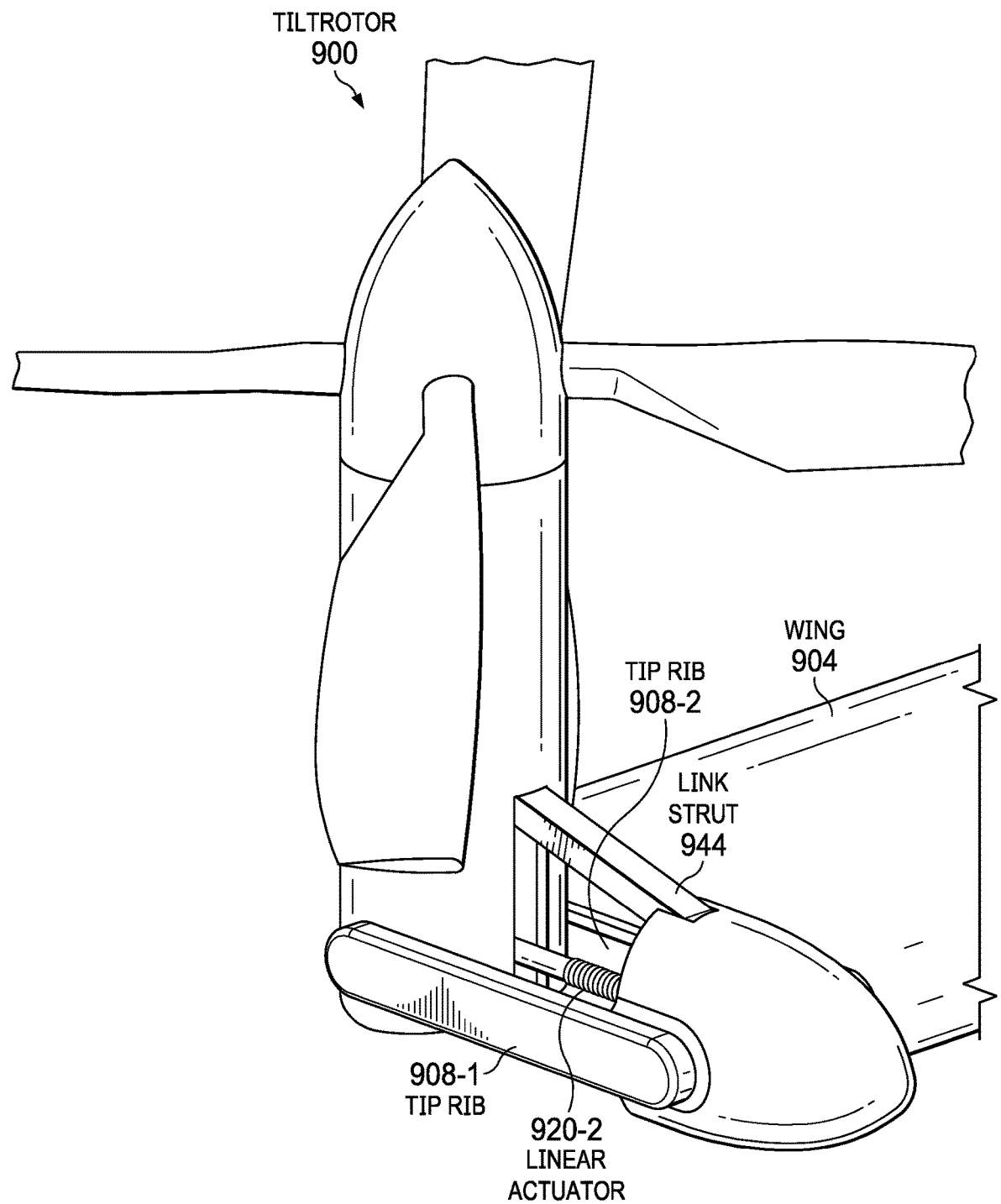
FIG. 10C is a perspective view illustration of tiltrotor in the full upright or vertical position.
Figure 11:
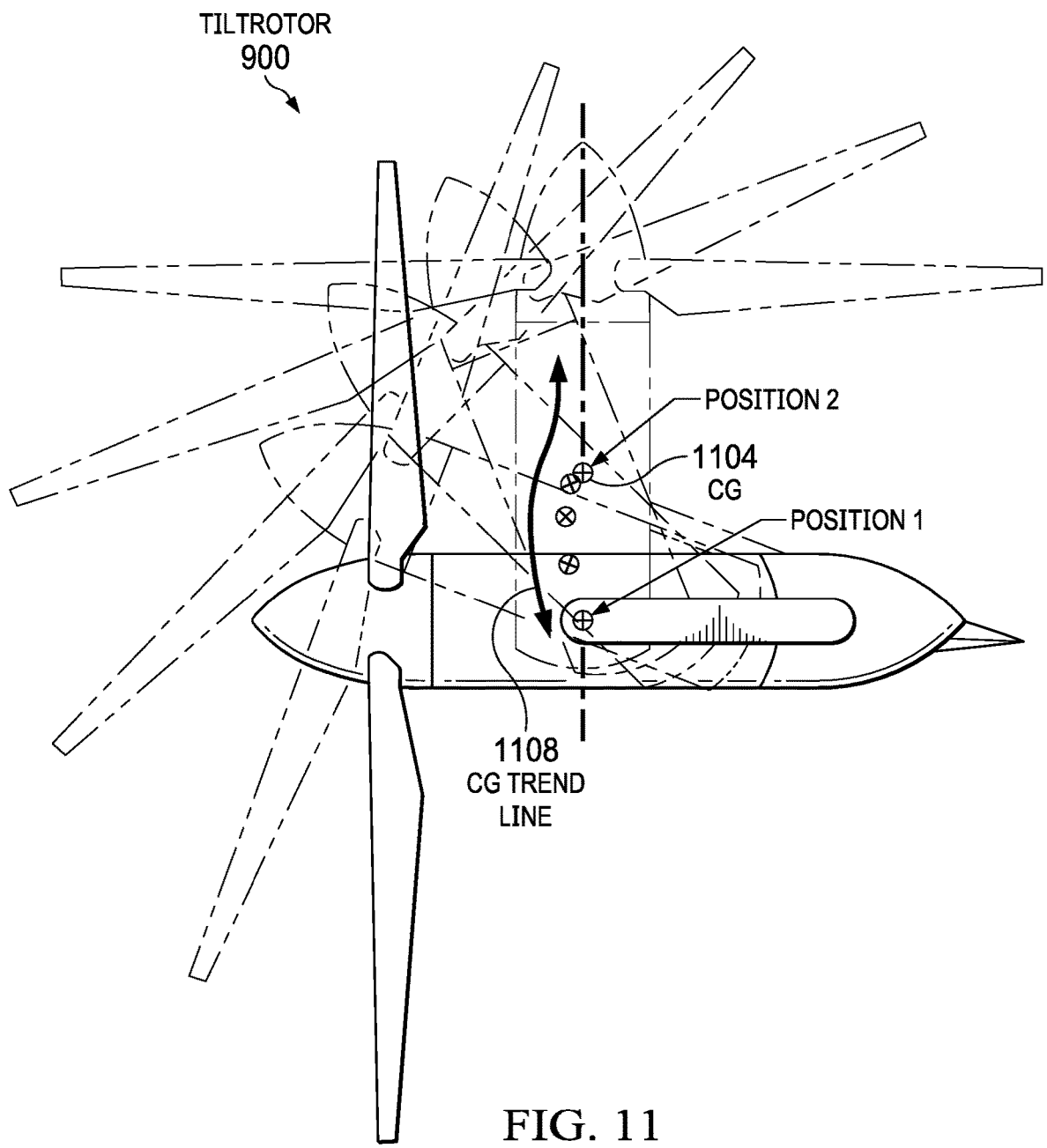
FIG. 11 is a perspective view illustration of tiltrotor illustrating movement of the center of gravity along a CG trendline.

FIGS. 10A, 10B, and 10C illustrate stages of operation of tiltrotor 900. In FIG. 10A, tiltrotor 900 is in a full vertical or forward configuration. Visible in this FIGURE are wing 904, link strut 944, and tip rib 908. This configuration may be, for example, when the rotorcraft is in airplane mode.

FIG. 10B illustrates an intermediate view of the tiltrotor maneuver. Again, tiltrotor 900 is visible along with link strut 944, wing 904, and tip rib 908. This configuration may represent a point where the tiltrotor maneuver has begun but has not yet been finished and thus represents an intermediate point.

FIG. 10C is a perspective view illustration of tiltrotor 900 in the full upright or vertical position. In this case, wing 904, linear actuator 920-2, tip rib 908-1, and link strut 944 are visible. Other elements may be present but are not as readily visible. In particular, although linear actuator 920-2 is visible, the dual linear actuator 920-1 is not readily visible. Note that the use of the dual linear actuator provides the substantial differentiation between the configuration of FIGS. 8A and 8B as compared to the configuration of FIGS. 9A and 9B. However, whether with one linear actuator or with two linear actuators, substantially the same center of gravity is realized. The primary difference is simply in the smoothness of the motion and the reliability of guiding the slot pin along the slot.

FIG. 11 is a perspective view illustration of tiltrotor 900 illustrating movement of the center of gravity along a CG trendline 1108. Note that CG trendline 1108 may be substantially the same for both configurations shown in FIGS. 8A/8B and FIGS. 9A/9B.

In this case, CG 1104 starts at position 1 when tiltrotor 900 is in the airplane configuration in its full horizontal position. As tiltrotor 900 goes through the tiltrotor maneuver, CG 1104 follows CG trendline 1108. In this case, CG trendline 1108 is not perfectly vertical and may experience some slight migration in the longitudinal direction. For example, in this case, CG trendline 1108 moves slightly toward the forward part of tiltrotor 900. However, CG 1104 terminates at substantially in an upright position at position 2 that is co-linear with position 1 and with the vertical axis of tiltrotor 900. Thus, position 1 and position 2 still land in the same desired vertical orientation with position 2 somewhat higher than position 1 as desired. The slight forward migration of CG trendline 1108 is an artifact of using the link strut instead of using a cam slot as illustrated in FIGS. 5A and 5B. This may represent an acceptable trade-off between design complexity and cost and realization of the desired center of gravity trendline.

Figure 12:
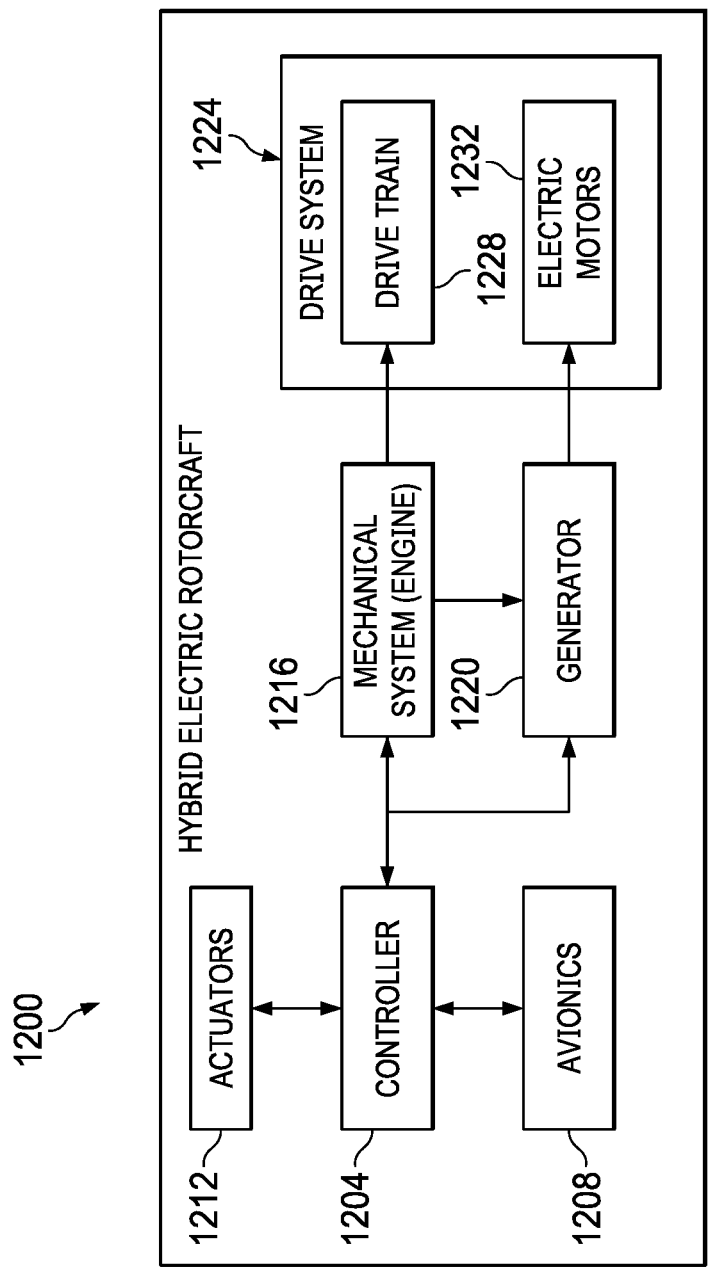
FIG. 12 is a block diagram of selected elements of a tiltrotor aircraft.

FIG. 12 is a block diagram illustration of selected elements of a rotorcraft 1200, which may be a manned, unmanned, or semi-autonomous rotorcraft. Rotorcraft 1200 includes a controller 1204. A controller 1204 may be configured for autonomous or semiautonomous configuration. For example, in a semiautonomous configuration, controller 1204 may receive gross command inputs, which indicate, for example, a direction, an airspeed, an altitude, or other desired functionality. In that case, controller 1204 may still need to perform calculations to carry out these instructions. In a fully autonomous configuration, controller 1204 may simply be programmed with a predesignated flight plan, and controller 1204 may have responsibility for fully carrying out the designated flight plan. In a manned configuration, controller 1204 may provide "fly by wire" services, such as converting a pilot's command inputs into actuations on flight control services.

In performing calculations and computations, controller 1204 may receive inputs from avionics 1208. Avionics 1208 may include various sensors, transducers, and other data that provide controller 1204 with information about the aircraft, its operating condition, the outside condition, and other factors. This can include traditional avionics, such as roll, pitch, yaw, outside air temperature, rotor speed, temperature sensors, synchro resolvers, and other information that may be useful for controller 1204 to make decisions about operation of rotorcraft 1200. Controller 1204 may then use this information to drive actuators 1212, which may be coupled to control surfaces of the aircraft, to control roll, pitch, yaw, altitude, rotor speed, and other factors that effect the desired flight path of the rotorcraft. For example, actuators 1212 may be mechanically and communicatively coupled to a driveshaft, to a collective controller, or to airfoil surfaces.

Controller 1204 may have access to a mechanical system, such as an engine 1216. Mechanical system 1216 may include, for example, a chemical or petrochemical engine that operates by burning or exhausting fuel. In some cases, mechanical system 1216 may directly drive a drivetrain 1228 which is part of a drive system 1224.

In the same or a different embodiment, at least partial electrical control may be provided. In that case, mechanical system 1216 could provide instantaneous power to a generator 1220, which provides electrical power to electric motors 1232. Electric motors 1232 may also be used to drive rotors and provide power to the aircraft. In some cases, a mechanical drivetrain 1228 may be omitted and the system may be powered directly by electric motors 1232. In other cases, electric motors 1232 may be omitted and the system may be powered purely by a drivetrain 1228. In yet other examples, some mechanical systems may be driven by drivetrain 1228, and others may be driven by electric motors 1232. Furthermore, in some cases, mechanical system 1216 could be omitted, and instead, batteries or other alternative power sources could provide power to generator 1220.

Design Variations and Ranges

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

Selected Examples

The teachings of the present specification may be understood in terms of various examples, as follows.

There is disclosed in an example, a tiltrotor system for a vertical takeoff and landing (VTOL) aircraft, comprising: a rotor pylon, wherein the rotor pylon is rotatable, via a rotation maneuver, between a substantially horizontal orientation and a substantially vertical orientation; a linear actuator disposed to actuate the rotation maneuver; and a mechanical guide disposed to maintain a center of gravity along a substantially linear axis throughout the rotation maneuver.

There is further disclosed an example wherein the mechanical guide comprises a link strut.

There is further disclosed an example wherein the mechanical guide comprises dual link struts.

There is further disclosed an example wherein the mechanical guide comprises a cam slot and cam pin.

There is further disclosed an example wherein the linear actuator comprises a telescoping member.

There is further disclosed an example wherein the linear actuator comprises dual linear actuator rods.

There is further disclosed an example wherein the linear actuator comprises a screw.

There is further disclosed an example wherein the linear actuator comprises a pneumatic actuator.

There is further disclosed an example wherein the linear actuator comprises a hydraulic actuator.

There is further disclosed an example of a tiltrotor aircraft, comprising: an airframe; a power plant; and a tiltrotor drive system comprising two or more rotors, the rotors configured to rotate from a substantially vertical orientation for vertical lift to a substantially horizontal orientation for cruise, the tiltrotor drive system comprising means to maintain respective centers of gravity of the two or more rotors along a substantially vertical axis during a rotation of the rotors.

There is further disclosed an example wherein the means comprises a linear actuator and a link strut.

There is further disclosed an example wherein the means comprise a linear actuator and dual link struts.

There is further disclosed an example wherein the means comprise a linear actuator, a cam slot, and a cam pin.

There is further disclosed an example wherein the linear actuator comprises a telescoping member.

There is further disclosed an example wherein the means comprise dual linear actuator rods.

There is further disclosed an example wherein the tiltrotor aircraft is manned.

There is further disclosed an example wherein the tiltrotor aircraft is unmanned.

There is further disclosed an example wherein the tiltrotor aircraft is semi-autonomous.

There is further disclosed an example of a tiltrotor assembly for a vertical takeoff and landing (VTOL) aircraft, comprising: a rotor assembly; a pivotable attachment point to attach the rotor assembly to a wing of the VTOL aircraft; a linear actuator rotatably coupled at or near an aft end of a gear box of the rotor assembly; a slot pin to engage a substantially linear guide slot of the wing and disposed to align motion of the rotor assembly along a horizontal axis; and a first link strut affixed to an upper surface of the rotor assembly forward of the aft end of the gear box.

There is further disclosed an example, further comprising a second link strut parallel to the first link strut.

There is further disclosed an example, wherein the linear actuator comprises dual linear actuator rods.

There is further disclosed an example, where in the linear actuator comprises a screw, a pneumatic actuator, or a hydraulic actuator.

What is claimed is:

1. A tiltrotor system for a vertical takeoff and landing (VTOL) aircraft, comprising:
   a rotor pylon, wherein the rotor pylon is rotatable, via a rotation maneuver, between a substantially horizontal orientation and a substantially vertical orientation;
   a linear actuator disposed to actuate the rotation maneuver; and
   a mechanical guide disposed to maintain a center of gravity along a substantially linear axis throughout the rotation maneuver.

2. The tiltrotor system of claim 1, wherein the mechanical guide comprises a link strut.

3. The tiltrotor system of claim 1, wherein the mechanical guide comprises a cam slot and cam pin.

4. The tiltrotor system of claim 1, wherein the linear actuator comprises a telescoping member.

5. The tiltrotor system of claim 1, wherein the linear actuator comprises dual linear actuator rods.

6. The tiltrotor system of claim 1, where in the linear actuator comprises a screw.

7. The tiltrotor system of claim 1, wherein the linear actuator comprises a pneumatic actuator.

8. The tiltrotor system of claim 1, wherein the linear actuator comprises a hydraulic actuator.

9. A tiltrotor aircraft, comprising:
   an airframe;
   a power plant; and
   a tiltrotor drive system comprising two or more rotors, the rotors configured to rotate from a substantially vertical orientation for vertical lift to a substantially horizontal orientation for cruise, the tiltrotor drive system comprising means to maintain respective centers of gravity of the two or more rotors along a substantially vertical axis during a rotation of the rotors.

10. The tiltrotor aircraft of claim 9, wherein the means comprises a linear actuator and a link strut.

11. The tiltrotor aircraft of claim 9, wherein the means comprise a linear actuator, a cam slot, and a cam pin.

12. The tiltrotor aircraft of claim 9, wherein the means comprise dual linear actuator rods.

13. The tiltrotor aircraft of claim 9, wherein the tiltrotor aircraft is unmanned or semiautonomous.

14. The tiltrotor aircraft of claim 9, wherein the tiltrotor aircraft is manned.

15. A tiltrotor assembly for a vertical takeoff and landing (VTOL) aircraft, comprising:
   a rotor assembly;
   a pivotable attachment point to attach the rotor assembly to a wing of the VTOL aircraft;
   a linear actuator rotatably coupled at or near an aft end of a gear box of the rotor assembly;
   a slot pin to engage a substantially linear guide slot of the wing and disposed to align motion of the rotor assembly along a horizontal axis; and
   a first link strut affixed to an upper surface of the rotor assembly forward of the aft end of the gear box.

16. The tiltrotor assembly of claim 15, wherein the linear actuator comprises dual linear actuator rods.

17. The tiltrotor assembly of claim 15, where in the linear actuator comprises a screw, a pneumatic actuator, or a hydraulic actuator.

* * * * *